United States Patent [19]

Conley et al.

[11] Patent Number: 4,898,201

[45] Date of Patent: Feb. 6, 1990

[54] PORTABL TOOL FOR CLEANING VALVE BORES AND ASSOCIATED INLET PASSAGE

[75] Inventors: Jeff A. Conley, Sugar Land; Jeffrey T. Lynch, Houston, both of Tex.

[73] Assignee: Keystone International, Inc., Houston, Tex.

[21] Appl. No.: 308,000

[22] Filed: Feb. 9, 1989

[51] Int. Cl.[4] .......................... B08B 1/00; B08B 9/06; F16L 55/00

[52] U.S. Cl. .............................. 137/245.5; 15/104.16; 137/244; 285/354; 285/355; 285/382.7

[58] Field of Search ......................... 15/104.16, 104.31; 137/244, 245.5; 285/12, 341, 342, 347, 354, 355, 356, 382.7

[56] References Cited

U.S. PATENT DOCUMENTS

| | | | |
|---|---|---|---|
| 195,181 | 9/1877 | Strohm | 15/104.16 |
| 751,538 | 2/1904 | Murdock | 137/245.5 |
| 875,832 | 1/1908 | Mann | 15/104.16 |
| 1,190,277 | 7/1916 | Flynn | 137/245.5 |
| 2,761,705 | 9/1956 | Kreidel | 285/382.7 |
| 3,776,577 | 12/1973 | Dickey | 285/355 |
| 3,970,336 | 7/1976 | O'Sickey et al. | 285/382.7 |
| 4,192,342 | 3/1980 | Adams | 137/245.5 |
| 4,391,289 | 7/1983 | Adams | 137/245.5 |
| 4,475,748 | 10/1984 | Ekman | 285/354 |

*Primary Examiner*—George L. Walton
*Attorney, Agent, or Firm*—Dodge, Bush & Moseley

[57] ABSTRACT

A portable cleaning tool (12) for cleaning the bore (38) of a valve (10) comprising a tool fitting or connector (52) with a reduced diameter inner end portion (82) having an O-ring (86) for sealing against an enlarged bore portion (40) of the valve body (18). The conenctor (52) is threaded within the enlarged end bore (44) to engage in abutting relation an internal shoulder (46). The cleaning member (60) is of an enlarged diameter and has a tapered seat (63) adapted for seating in a retracted position on a mating tapered seat (88) of the connector (52) to prevent any blowout of the cleaning member (60). One embodiment shown in FIGS. 5 and 6 has an internally threaded nut (108) threaded onto external mating screw threads (110) on the valve body and engaging a retainer ring (106) on the connector body (53A) for mounting the connector (52A) on the valve (10A).

7 Claims, 3 Drawing Sheets

FIG. 1
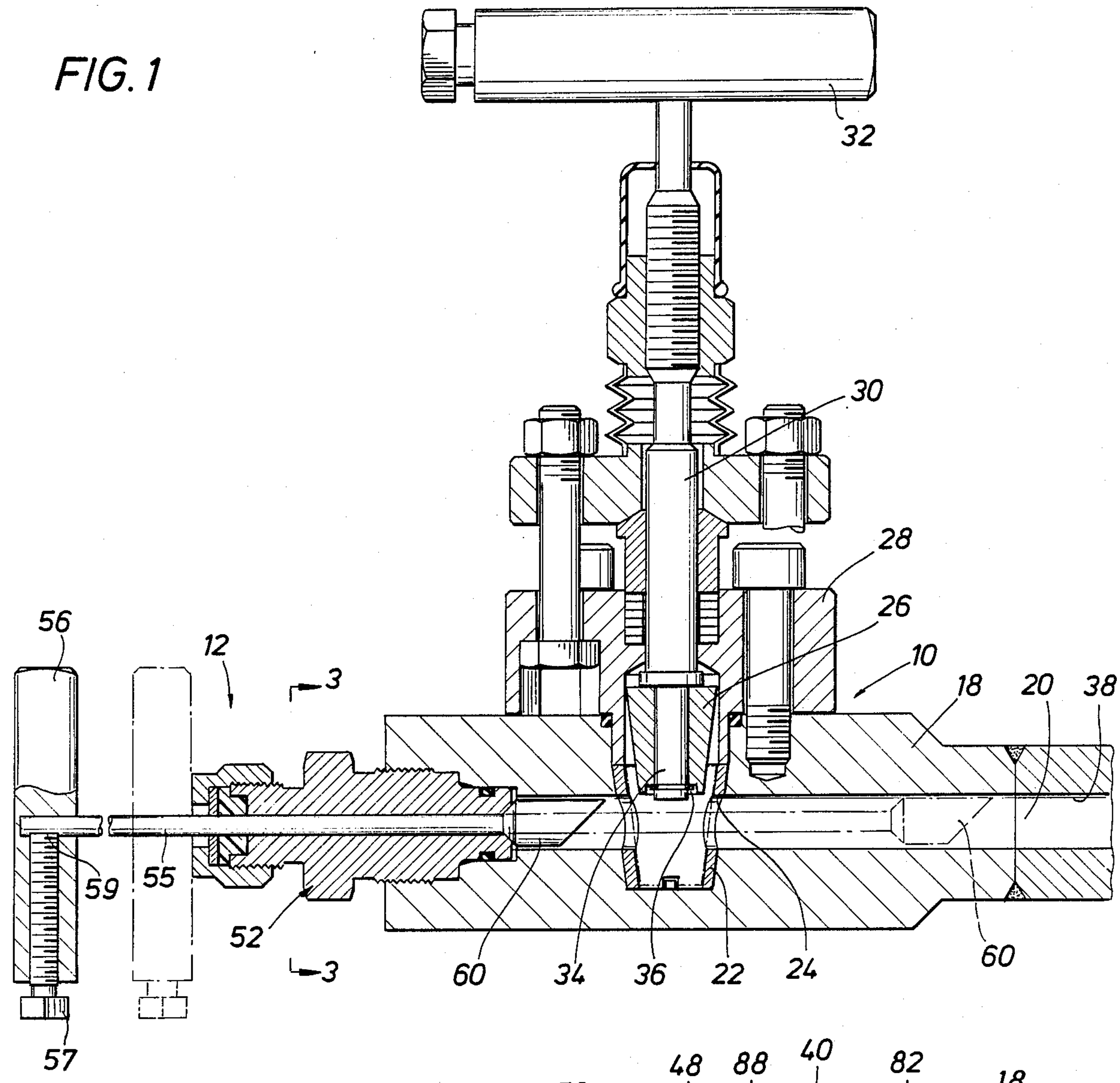
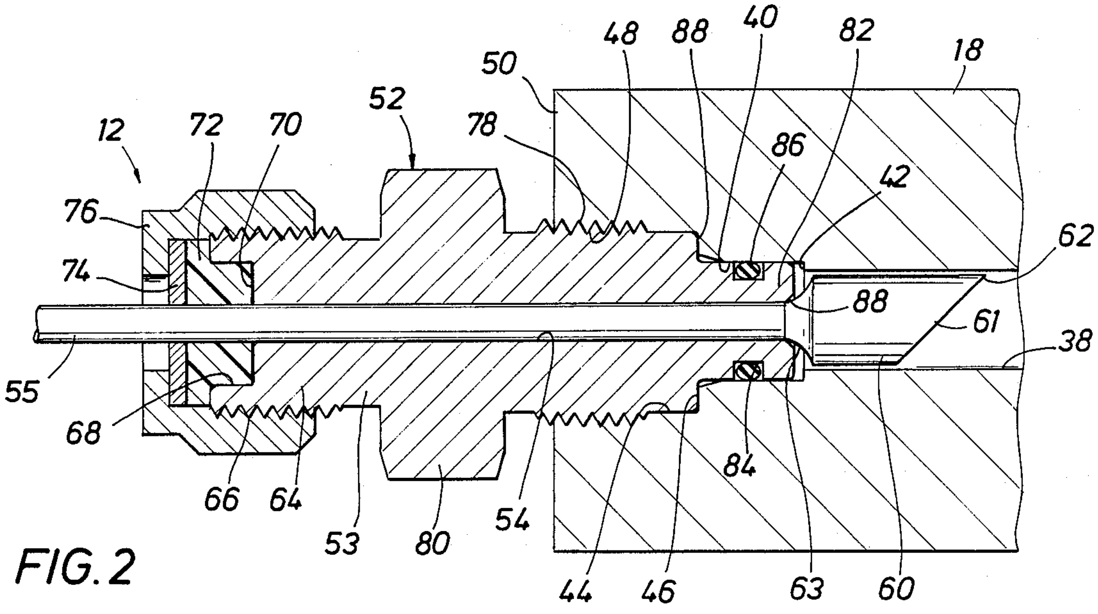
FIG. 2

PORTABL TOOL FOR CLEANING VALVE BORES AND ASSOCIATED INLET PASSAGE

BACKGROUND OF THE INVENTION

This invention relates to a tool for cleaning a valve bore, and more particularly to a portable tool adapted for connection to a valve under pressure for cleaning the valve bore and associated inlet passages in the open position of the associated valve member.

Heretofore, portable cleaning tools for valves have been provided which are adapted to be connected to the valve under pressure for cleaning the valve bore in the open position of an associated valve member which is opened after connection of the tool. Normally, a flow line such as tubing is connected to an end of the valve by a fitting received within an end opening of the valve with the tubing being in axial alignment with the valve bore. The fitting and associated tubing are normally disconnected and removed from the end of the valve after movement of the valve member to closed position blocking fluid flow through the valve bore. Then, a cleaning tool having a fitting is secured within the end opening of the valve with the tool in a retracted position. The tool includes a rod having a cleaning member on its inner end. Next, the valve member is opened and the rod with the cleaning member is extended through the bore in the valve member which is axially aligned with the valve bore. The cleaning member may be reciprocated and rotated during the cleaning operation for cleaning of the valve bore. After the cleaning is completed with the so-called "rod-out" device, the cleaning member is retracted and the valve member closed. Then, the cleaning tool may be removed from the valve and the tubing reconnected to the valve. Such a cleaning process has been utilized heretofore for cleaning valves, and particularly for cleaning relatively small diameter valves associated with manifolds or instrument valves to control fluid flow to and from such devices.

SUMMARY OF THE INVENTION

The present invention is directed to an improved portable tool for cleaning valve bores which has an improved connection or fitting for connecting the tool to the valve. Such fittings or connections heretofore have generally utilized tapered threads for effecting a sealing relation between the fitting and valve body and the fittings must be tightly threaded in order to provide a tight sealing relation. The valve end opening for receiving the improved portable tool permits the improved sealing connection for the tool. In addition to cleaning the valve bore, the tool may also be utilized for cleaning the tubing or piping for the inlet, and in some instances the orifice flange.

The improved tool connector for connecting the tool to the valve body comprises an elongate body having a central bore therethrough and an inner generally cylindrical end portion of a reduced diameter with an annular groove therein for receiving an elastomeric O-ring. The inner end portion of the connector has an annular shoulder about the central bore and the enlarged diameter cleaning member on the end of a rod has an opposed shoulder adapted for contacting or seating on the annular shoulder of the connector in the retracted inoperable position of the cleaning member thereby preventing blowout of the cleaning member in the event abnormally high fluid pressures in the valve are encountered.

Such an improved connector is easily mounted in sealing relation on the valve body after removal of the associated flow line without the necessity of having the threaded connection being tight in order to maintain sealing relation since the O-ring seal effects sealing even with a loose threaded connection.

It is an object of the present invention to provide an improved portable cleaning tool for cleaning valve bores with the tool having an improved connector or fitting for connecting the tool to the valve body.

Another object of the invention is to provide such an improved cleaning tool having a fitting or connector for mounting the tool on a valve body with the connector having a reduced diameter inner end portion with an O-ring seal about the reduced diameter end portion providing a sealing relation with the valve bore in the event the connector is not tightly threaded onto the valve body.

Other objects, features, and advantages of this invention will become more apparent after referring to the following specification and drawings.

BRIEF DESCRIPTION OF THE DRAWINGS

FIG. 1 is a longitudinal sectional view of one embodiment of the portable cleaning tool comprising the present invention installed within the end opening of a valve body for cleaning the valve bore;

FIG. 2 is an enlarged fragment of FIG. 1 showing the fitting for the portable tool positioned in sealing relation within the enlarged diameter end opening of the valve body;

DETAILED DESCRIPTION OF INVENTION

Figure 3:
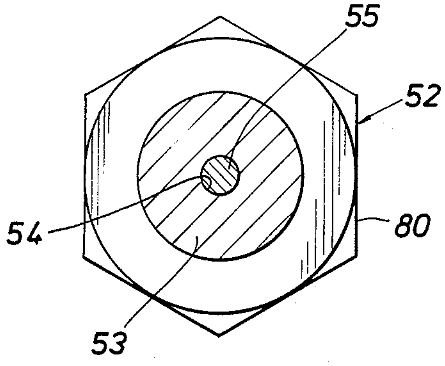
FIG. 3 is a section taken generally along line 3—3 of FIG. 1 and showing a hexagonal nut on the connector body adapted to be engaged by a wrench or the like for mounting the portable tool on the valve body.
Figure 4:
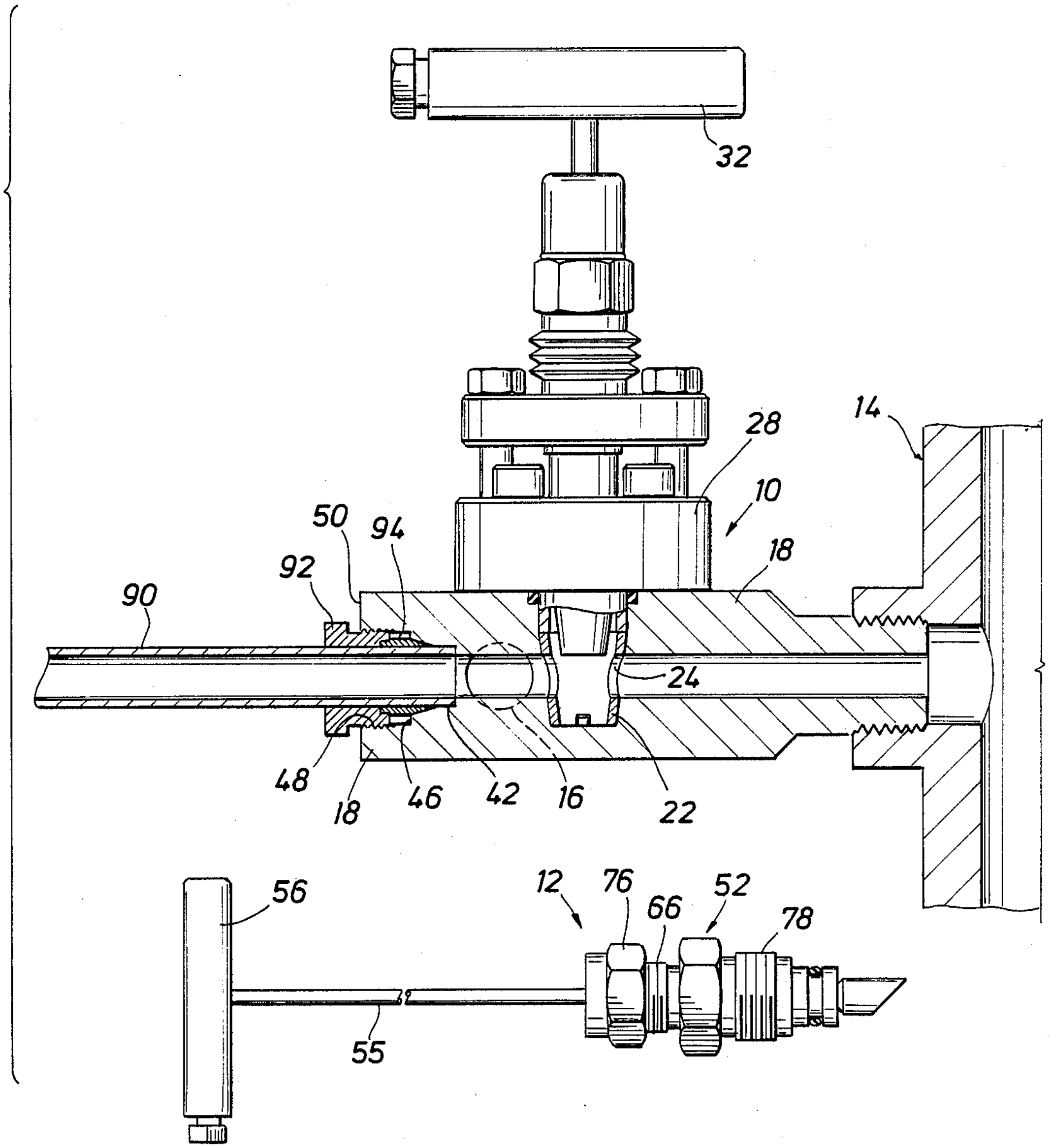
FIG. 4 is an exploded view showing the cleaning tool removed from the valve body with the normal flow line and associated fitting shown reconnected to the valve body which in turn is connected to a manifold.

Referring now to the drawings for a better understanding of this invention, and more particularly to the embodiment of the cleaning tool shown in FIGS. 1–4, a valve is indicated generally at 10 with which the portable cleaning tool indicated generally at 12 is used. Valve 10 is mounted adjacent a manifold generally indicated at 14 as shown in FIG. 4 and an instrument flow line shown generally at 16 in broken lines has one end connected to valve 10 and an opposite end connected to a suitable instrument or measuring gage (not shown).

Valve 10 includes a valve body 18 having a central bore 20 therethrough. A valve sleeve 22 includes an opening 24 aligned with central bore 20. A tapered valve member 26 is mounted for movement between open and closed positions relative to opening 24 in sleeve 22. A bonnet 28 receives a valve stem 30 having a handle 32 at its extending end for manual rotation thereof. The lower end portion 34 of stem 30 is received within a central opening of tapered valve member 26 and retaining ring 36 retains lower end portion 34 within tapered valve member 26. Upon manual rotation of handle 32, tapered valve member 26 moves up and down in a longitudinal direction without being rotated since valve member 26 may rotate relative to lower end portion 34 of stem 30.

Bore 20 has a main small diameter portion 38, an intermediate diameter portion 40, an annular shoulder 42 at the juncture of main bore portion 38 and intermediate diameter portion 40, a large diameter bore portion 44, and an annular shoulder 46 formed at the juncture of large diameter bore portion 44 and intermediate diameter bore portion 40. Internal screw threads 48 are defined by large diameter bore portion 44 adjacent end 50 of valve body 18..

Cleaning tool 12 includes a fitting or connector generally indicated at 52 having an elongate body 53 with a central bore 54 extending therethrough. A rod 55 is received in central bore 54 and has a removable handle 56 on an extending end thereof secured to rod 55 by a retaining screw 57 having an extending end fitting in a slot 59 of rod 55. A cleaning member 60 is mounted on the inner end of rod 55 and is of generally cylindrical shape having an inclined leading end surface 61 forming a sharp edge 62 for scraping along bore 38. A trailing end surface 63 of cleaning member 60 forms a shoulder to provide a stop in the retracted position of cleaning member 60.

Connector 52 has an outer end portion 64 defining external screw threads 66 and an annular recess 68 adjacent its outer end defining an annular shoulder 70. A packing 72 is received within recess 68 and fits in abutting relation against shoulder 70. A washer 74 is positioned adjacent the outer end of packing 72 and is received within an internally threaded outer nut 76 engaging external threads 66 on end portion 64. Upon tightening of nut 76, washer 74 compresses packing 72 for sealing about rod 55.

External screw threads 78 are provided on the elongate body 53 intermediate the ends thereof and an integral hexagonal nut 80 is formed on body 53 between screw threads 66 and 78. Connector body 53 has an inner end portion 82 of a reduced diameter with an annular groove 84 therein for receiving an O-ring 86. An annular shoulder 88 is formed at the juncture of reduced diameter end portion 82 with the main body portion 54, and an inner tapered seat 88 on the end of reduced diameter end portion 82 at bore 54 is adapted to receive cleaning member 60 in retracted position as shown in FIG. 2 to restrict further outward movement of cleaning member 60.

Prior to installation of portable cleaning tool 12 on valve 10 and referring to FIG. 4, a flow line or tubing shown at 90 has an inner end which abuts shoulder 42 and a compression nut 92 is threaded within the end of valve body 18 in threaded relation with screw threads 48 for compressing a metal ferrule 94 into sealing relation about flow line 90. With tapered valve member 26 in a closed position, flow line 90, nut 92, and ferrule 94 are first removed and then cleaning tool 12 is inserted within the end opening with screw threads 78 being threaded with screw threads 48. A suitable wrench or the like may be provided to engage hexagonal nut 80 and rotate connector 52 into installed position with shoulders 46 and 88 in abutting relation and O-ring 86 engaging the intermediate diameter bore portion 40 in sealing relation.

It is noted that O-ring 86 provides a sealing relation with intermediate bore portion 40 even in the event that connector 52 is not tightly mounted within the end opening. It is pointed out that tapered valve member 26 is moved to a closed position to block any fluid flow in bore 38 during removal of flow line 90 and installation of cleaning tool 12. After installation of cleaning tool 12, tapered valve member 26 is moved to a opened position, and then rod 55 along with cleaning member 60 are reciprocated within bore 38 to clean the orifice or opening 24 in sleeve 22 along with bore 38. In the event of a very high fluid pressure being reached in bore 38, valve member 60 retracts with end surface 63 seating on seat 88 thereby to prevent any blowout of cleaning member 60. Upon completion of the cleaning operation, tapered valve member 26 is again moved to closed position, and cleaning tool 12 is removed from valve body 18 with tubing 90 along with nut 92 and ferrule 94 being reconnected to the end of valve body 18.

Figure 5:
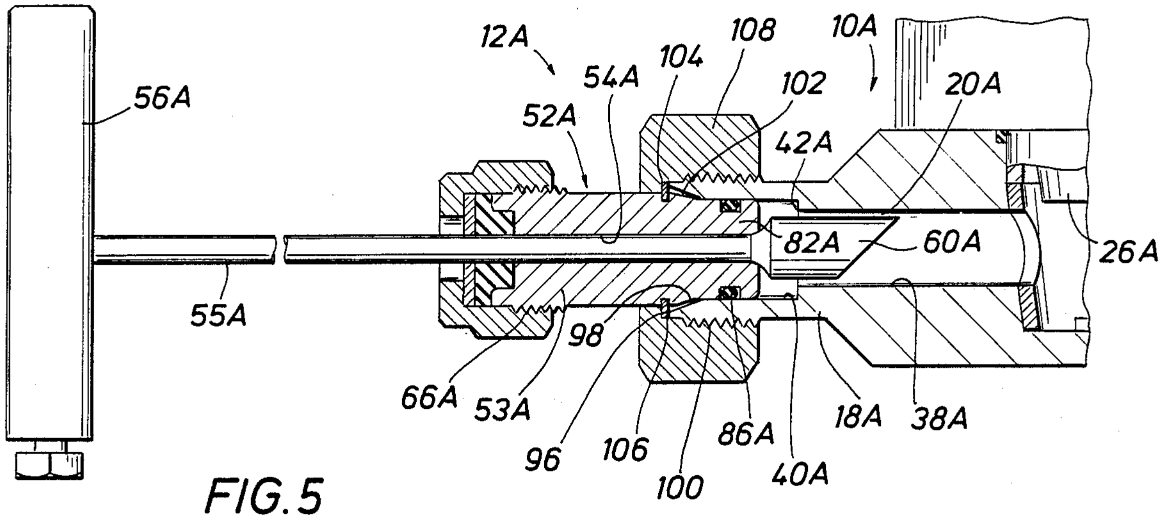
FIG. 5 is an enlarged longitudinal sectional view of a modified cleaning tool connected to external screw threads on the valve body.
Figure 6:
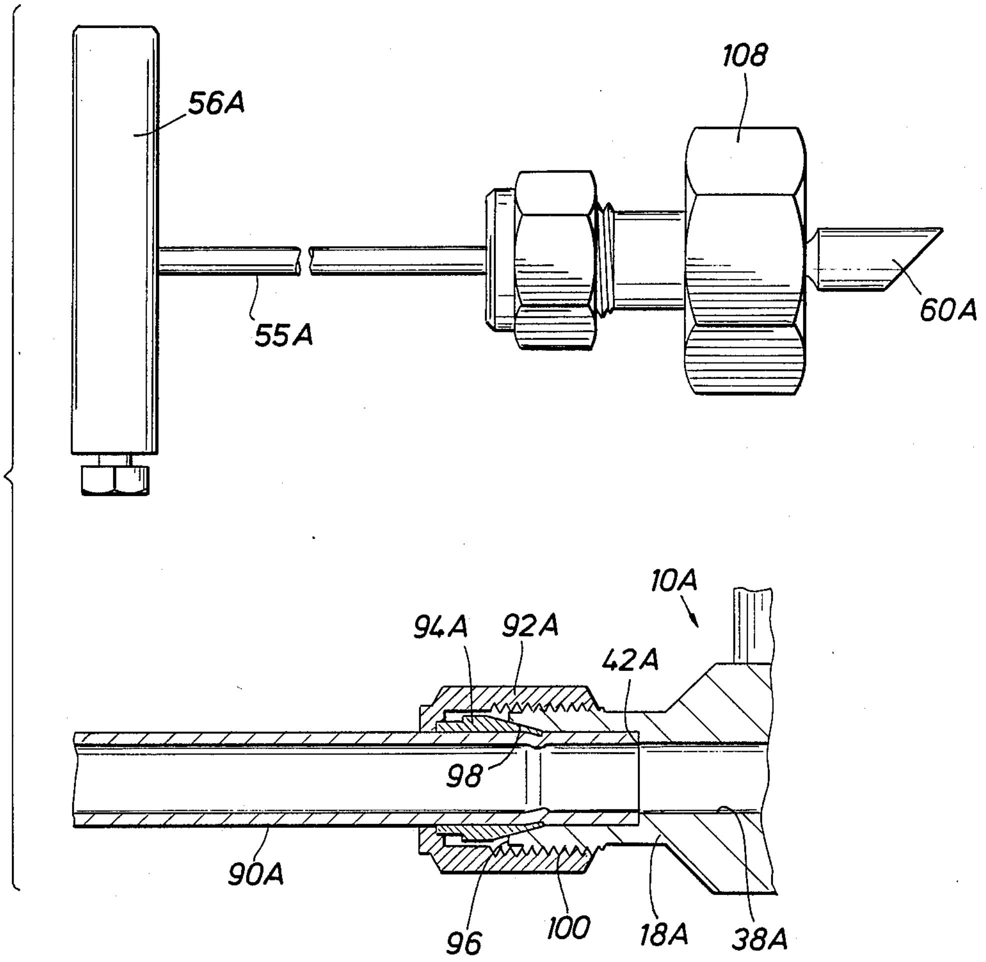
FIG. 6 is an exploded view showing the modified cleaning tool of FIG. 5 removed from the valve with the normal flow line and associated fitting shown reconnected to the valve.

Referring now to FIGS. 5 and 6, a separate embodiment of a portable cleaning tool for valves is indicated at 12A for fitting within an end of valve 10A. Valve body 18A includes a central bore 38A with a valve member 26A mounted for movement between open and closed positions relative to bore 38A. Valve bore generally designated 20A has an enlarged diameter bore portion 40A defining an annular shoulder 42A at the juncture of main bore portion 20A and enlarged diameter bore portion 40A. Body 18A has an outer end 96 and a tapered end bore portion 98 extends between end 96 and enlarged bore portion 40A.

External screw threads 100 are provided on the outer end portion of valve body 18A adjacent end 96. Tool fitting or connector 52A has an elongate body 53A forming external screw threads 66A adjacent one end thereof. A central bore 54A extends through body 53A. A reduced diameter inner end portion 82A of elongate body 53A has an annular groove 84A therein and an O-ring 86A is received therein for sealing against enlarged diameter bore portion 40A of valve body 18A as shown in FIG. 5. Body 53A has a tapered shoulder 102 at the juncture of reduced diameter end portion 82A and main body portion 53A, and an annular groove 104 is provided in body 53A adjacent tapered shoulder 102. A split retaining ring 106 is received within annular groove 104 and fits against end 96 of valve 10A.

An internally threaded nut 108 fits about body 53A and is tightened onto external threads 100 for exerting compression against snap ring 106 to provide seating against end 96 for mounting tool 12A on valve body 10A. Cleaning member 60A and rod 55A along with handle 56A are identical to the embodiment shown in FIGS. 1-4.

For installation of tool 12A, internally threaded nut 92A and tubing 90A along with metal ferrule 94A are first removed from valve body 18A with valve member 26A closed. Tool 12A is then inserted within the end opening with O-ring 86A engaging enlarged bore portion 40A in sealing relation. Tighting of nut 108 on screw threads 100 urges split ring 106 against end 96 and mounts tool 12A onto valve 10A. Tool 12A is then operated in a matter similar to that of the embodiment FIGS. 1-4 for cleaning valve 10A.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. In combination with a valve having a valve body with a central bore therethrough including a main bore portion, and a valve member mounted for movement between open and closed positions relative to said main bore portion, said central bore having an enlarged diameter end bore portion defining an end opening of an enlarged diameter to provide an annular shoulder at the juncture of the enlarged diameter end bore portion with the main bore portion with said end opening adapted to receive a flow line having an end abutting said shoulder and being removably secured to said valve body;

the improvement of a portable tool for cleaning said valve bore adapted to be removably connected to said enlarged diameter bore portion of said valve body upon removal of said flow line therefrom; said portable tool comprising:

a tool connector having an elongate body with a central bore therethrough;

a rod extending through said central bore having a handle on an outer end thereof and an enlarged diameter cleaning member on the inner end thereof of a diameter slightly less than the diameter of said valve bore for fitting within said valve bore, said rod being mounted for reciprocal movement relative to said connector for cleaning said valve bore upon opening of said valve member;

said elongate body of said connector having means for engaging said enlarged diameter cleaning member in a retracted position to prevent outward movement thereof, a main intermediate body portion of a generally uniform outer diameter, an externally threaded outer end body portion receiving a packing extending about said rod, and an inner end body portion of a reduced diameter for closely fitting within said enlarged diameter bore portion of said valve body adjacent said shoulder;

an internally threaded nut threaded onto said outer end body portion and compressing said packing for forming a sealing relation about said rod;

an annular groove about said reduced diameter inner end body portion, an O-ring received within said annular groove, and threaded means removably securing said connector to said valve body with said reduced diameter end portion thereof received within said end opening with said O-ring in sealing relation.

2. The combination set forth in claim 1 wherein said valve body has the end thereof adjacent said end opening formed with external screw threads, and an internally threaded nut fits about said tool connector body and is threaded onto said valve end in sealing relation thereto.

3. The combination set forth in claim 1 wherein said enlarged diameter bore portion of said valve is internally threaded and said elongate body of said tool connector is formed with external screw threads for removably mounting said connector within said end opening.

4. The combination set forth in claim 1 wherein said elongate connector body has a shoulder adjacent the inner end of its central bore, and said cleaning member has a shoulder adjacent said rod adapted to seat on said connector shoulder in said retracted position of the tool thereby to prevent blowout of the cleaning member under relatively high pressures within the valve bore.

5. For use with a valve having a valve body with a central bore therethrough defining a main bore portion, a valve member mounted for movement between open and closed positions relative to said central bore, said central bore defining an end opening including an intermediate diameter bore portion and a large diameter bore portion with an inner annular shoulder at the juncture of said main bore portion and said intermediate bore portion, and an outer annular shoulder at the juncture of the intermediate bore portion and the large diameter bore portion, said large diameter bore portion defining internal screw threads therein, said valve body adapted to receive the inner end of a flow line in abutting relation against said inner shoulder, and an externally threaded nut mounted about said flow line in threaded relation with said internally threaded bore portion for removably securing said flow line within said end opening;

the improvement of a portable cleaning tool for cleaning said valve bore adapted to be removably connected within said end opening upon removal of said flow line and associated nut; said portable cleaning tool comprising:

a tool connector having an elongate body with a central bore therethrough;

a rod extending through said bore having a handle on an outer end thereof and an enlarged diameter cleaning member on the inner end thereof, said cleaning member being generally cylindrical in shape with a trailing end surface to define an annular seat, and an inclined leading end surface to define a leading scraping edge;

said elongate body of said connector having means for engaging said enlarged diameter cleaning member in a retracted position to prevent outward movement thereof, a main intermediate body portion of a generally uniform cross section, an externally threaded outer end portion, an externally threaded intermediate portion, an integral nut between the threaded portions for rotation of said connector, an inner end portion of a reduced diameter defining an annular shoulder at its juncture with said externally threaded intermediate portion, an annular groove about said reduced diameter inner end portion, and an O-ring received within said annular groove, said connector body being threaded within said end opening of said valve with said externally threaded intermediate portion of said connector engaging said screw threads of said large diameter bore portion of said valve and said shoulder on said connector engaging in abutting relation said outer annular shoulder defined by said central bore of said valve with said O-ring sealing within said central bore;

a packing extending about said rod and received within the outer end of said connector; and an internally threaded nut threaded onto said outer end portion and compressing said packing for forming a sealing relation about said rod.

6. The improved portable cleaning tool as set forth in claim 5 wherein a washer is positioned between said packing and said internally threaded nut for compressing said packing upon tightening of said nut.

7. For use with a valve having a valve body with a central bore therethrough defining a main bore portion, a valve member mounted for movement between open and closed positions relative to said central bore, said central bore defining an end opening including an intermediate diameter bore portion and a large diameter bore portion with an inner annular shoulder at the juncture of said main bore portion and said intermediate bore portion, and an outer annular shoulder at the juncture of the intermediate bore portion and the large diameter bore portion, said large diameter bore portion defining internal screw threads therein, said valve body adapted to receive the inner end of a flow line in abutting relation against said inner annular shoulder, and an externally threaded nut mounted about said flow line in threaded relation with said internally threaded bore portion for removably securing said flow line within said end opening;

the improvement of a portable cleaning tool for cleaning said valve bore adapted to be removably connected within said end opening upon removal of said flow line and associated nut; said portable cleaning tool comprising:

a tool connector having an elongate body with a central bore therethrough;

a rod extending through said bore having a handle on an outer end thereof and an enlarged diameter cleaning member on the inner end thereof, said cleaning member being generally cylindrical in shape with a trailing end surface to define an annular seat, and an inclined leading end surface to define a leading scraping edge;

said elongated body of said connector having means for engaging said annular seat of said cleaning member in a retracted position to prevent outward movement thereof, a main intermediate body portion of a generally uniform cross section, an externally threaded outer end portion, an inner end portion of a reduced diameter defining a tapered shoulder at its juncture with said intermediate portion, a first annular groove about said reduced diameter inner end portion, an O-ring received within said first annular groove, and a second annular groove about said intermediate body portion outwardly of said tapered shoulder;

a retainer ring received within said second annular groove and extending laterally over the adjacent outer end of said valve body;

a first internally threaded nut receiving said elongate body and retainer ring and threaded onto the external screw threads of said valve body adjacent the end of said body for compressing said retainer ring against the end of said valve body and holding said connector body within said end opening of said valve body;

a packing extending about said rod and received within the outer end of said connector body; and a second internally threaded nut threaded onto said outer end portion of said connector and compressing said packing for sealing about said rod.

* * * * *